June 24, 1969 C. A. MIVILLE ET AL 3,451,635

INCREMENTAL MAGNETIC TAPE RECORDER EMPLOYING SINGLE SPRING DRIVE MECHANISM

Filed Oct. 5, 1966

INVENTORS
CHARLES A. MIVILLE
FRED HUGEL

BY Philip D. Amins

ATTORNEY

United States Patent Office 3,451,635

Patented June 24, 1969

3,451,635

INCREMENTAL MAGNETIC TAPE RECORDER EMPLOYING SINGLE SPRING DRIVE MECHANISM

Charles A. Miville, Mount Vernon, N.H., and Fred Hugel, West Acton, Mass., assignors to Sanders Associates, Inc., Nashua, N.H., a corporation of Delaware Filed Oct. 5, 1966, Ser. No. 584,583
Int. Cl. G11b *15/30, 15/40*
U.S. Cl. 242—55.13 11 Claims

ABSTRACT OF THE DISCLOSURE

A magnetic tape recorder apparatus having a new drive for data-handling tape recorders which requires very little power for operation and which is particularly suited for use over extended periods of time. The new drive comprises a single capstan for metering tape past the recording head and a single constant torque coil spring for maintaining constant tension on the tape, utilizing no electrical power while the tape recorder is in the standby mode.

The present invention pertains to magnetic tape recorders and, more particularly, to a new drive for data-handling tape recorders which requires very little power for operation and which is particularly suited for use over extended periods of time.

This type of instrument is customarily disposed within an instrument package which is placed in the ocean at any desired depth and moored in place to periodically record desired information, such as velocity and direction of water current, water temperature, salinity, and other similar parameters. Since it is expensive and inconvenient to send a ship out frequently to recover the instrument, replace the used batteries and tape, and then replace the instrument in the ocean again, it is extremely important to provide a tape recorder which will fit within the limited space available therefor and which will, above all, have an extremely low current drain upon its batteries, so as to provide an instrument which is capable of operation for extended periods of time without requiring its batteries to be replaced.

The present invention is an improvement over our previously filed patent application Ser. No. 360,258, for "Incremental Magnetic Tape Recorder," filed Apr. 16, 1964, now U.S. Patent No. 3,294,332, issued Dec. 27, 1966. The advantage of the present invention over the recorder described in the aforementioned patent application is that the use of a single spring drive mechanism produces a substantial reduction in the inertia of the reel system, which results in a faster reel response. The faster reel response results in a smaller power drain on the tape recorder batteries, which permits the recorder to have an even longer on-station life between battery replacements. The recorder of the present invention, due to the fact that it utilizes fewer components, is less expensive than the recorder of the above-mentioned application.

The tape recorder of the present invention is particularly adapted to and designed for use in an oceanographic current meter of the type described and claimed in the patent application of Charles A. Miville, Ser. No. 360,259, entitled, "Magnetic Tape Oceanographic Meter," which application is assigned to the assignee of this application.

Although the tape recorder of the present invention has been described as being particularly adapted for use in a magnetic tape oceanographic meter, it is also capable of utilization in a variety of data-handling applications. In particular, it is well suited for use in cases where there is to be cyclic periodic recording of information, wherein the recorder is maintained in an idling or stand-by condition a major portion of the time.

The problem encountered with most present-day tape recorders is that they utilize a substantial amount of power when they are in a stand-by condition. This is occasioned by the fact that they utilize either tension motors or a combination of a tension motor and a friction clutch for maintaining tension in the recording tape disposed between the tape reels and for maintaining a state of dynamic equilibrium to advance the tape rapidly. This tension is, of course, required in order to maintain the tape in abutting engagement with the recording head, for if the tape is even slightly spaced from the recording head, the level of the recorded signal will be appreciably below the desired level. Also, when activated, these recorders require power to overcome the drag on the tape produced by the aforesaid tape tensioning devices before the capstan can advance the tape. It will be apparent that, when the above-described recorders are powered by batteries, the drain on the batteries is quite appreciable, thus requiring frequent replacement thereof, which results in the recorder having a relatively short on-station life.

It is therefore an object of the present invention to provide a magnetic tape recorder which requires a minimal amount of power to operate.

It is another object of the present invention to provide a magnetic tape recorder which is extremely small and which occupies a minimum of space due to the fact that it requires a minimum of power for operation and thus requires a battery source of minimal size.

It is a more particular object of the present invention to provide an incremental magnetic tape recorder which is powered by batteries and capable of being used in inaccessible places and for extended periods of time.

It is a further object of the present invention to provide a magnetic tape recorder having a single spring drive, which drive is operative to provide tension in the recording tape disposed between the tape reels without requiring any special tape tensioning motors, motor and clutch arrangements or the like, and where there is no power drain on the tape recorder batteries when the recorder is in a stand-by condition.

It is yet another object of the present invention to provide a magnetic tape recorder having a spring drive wherein the power required to advance the tape is supplied by the spring drive in conjunction with a small amount of power supplied to the capstan and wherein there is no power drain on the recorder batteries to overcome the drag on the tape disposed between the reels, as is the case with conventional tape recorders.

It is still another object of the present invention to provide an incremental magnetic tape recorder which is cyclically operative in response to a signal that indicates when information is to be recorded, and which, at all other times, remains in a stand-by condition wherein there is no power drain on its batteries.

It is yet a further object of the present invention to provide an incremental magnetic tape recorder wherein signals are recorded in digital form while the tape remains stationary, and whereinafter the tape is stepped to a new recording position and the recorder returns to its stand-by condition until there is additional information to be recorded.

These and other objects, features and advantages of the present invention will become more apparent from the following description of a specific embodiment, when considered in conjunction with the accompanying drawings, wherein.

Figures 1, 2, 3:
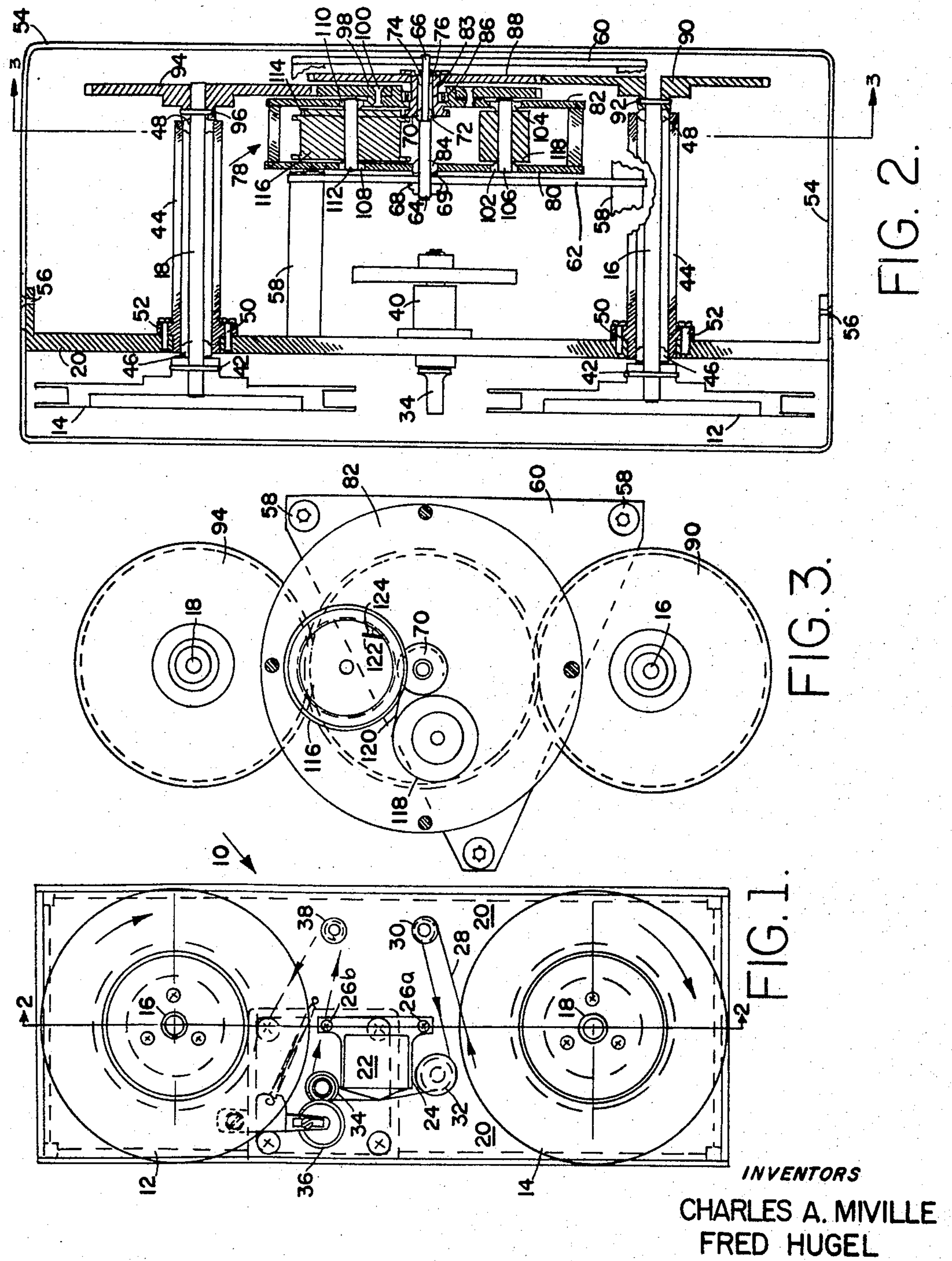
FIG. 1 is a top plan view of an incremental magnetic tape recorder constructed in accordance with the present invention, having certain elements of well-known construction not involved in the present invention omitted therefrom.
FIG. 2 is a partially sectioned front elevational view taken on the line 2—2 of FIG. 1, having certain portions of the recorder, of well-known construction, omitted for the purpose of clarity.
FIG. 3 is a plan view taken on the line 3—3 of FIG. 2.

In carrying out the invention, we employ a single "NegAtor" spring drive. The principle involved in the type of drive is that the "NegAtor" spring is a constant tension device whereby, when the coiled spring has its outer end wound in a direction which is opposite to its natural coiling bias, there exists in that portion of the spring which is extended, or flat, a constant tension; and there exist at the ends of said extended portion equal and opposite forces that place the extended spring portion in a state of dynamic equilibrium. Thus, there is no linear movement of the spring. The ends of the extended spring portion and, more particularly, the forces which exist thereon are effectively coupled to the tape reel shafts, whereby the forces tend to rotate the reel shafts in opposite directions. This tendency causes tension in the portion of the recording tape disposed between the reel shafts. However, since the forces are equal in magnitude and opposite in direction, there is no linear movement of the tape; and the tape prevents the reel shafts from actually rotating in opposite directions. Since that portion of the tape disposed between the reel shafts is in a state of dynamic equilibrium, a relatively small force exerted by the capstan upon said portion of the tape is sufficient to upset the dynamic equilibrium and, in so doing, pull the tape past the recording head. Since the tape tension is derived by means of the single "NegAtor" spring drive, there is no power drain on the batteries of the recorder when it is in a stand-by condition; while in conventional tape recorders a constant power drain on the batteries is necessary in order to produce tension in the tape. It will be appreciated that the capstan in the present invention is, in effect, a tape metering device which assures the constant feed of tape past the recording head, thus permitting use of a stepping motor. Such a motor requires a substantially smaller amount of power than would be necessary with conventional tape recorders, wherein the amount of power the capstan must impart to the tape to advance it is that necessary not only to advance the tape but also to overcome the drag thereon caused by apparatus, such as tension motors or tension motors in combination with friction drives, used to produce tension in the tape when the recorder is in its stand-by condition. Thus, the single "NegAtor" spring drive of the present invention increases the life of the tape recorder's batteries; and when the recorder is employed in a magnetic tape current meter of the type previously discussed, there results a meter which presents no power drain during standby condition and which, therefore, has a greatly extended on-station operating period between replacements of the recorder batteries.

Referring now to the drawings, and more particularly to FIG. 1, there is shown the incremental magnetic tape recorder of the present invention, 10. The recorder includes a take-up reel 12 and a supply reel 14, which reels are mounted for rotation on shafts 16 and 18, respectively. In the present embodiment, the reels rotate in the same direction. However, it will be apparent to those skilled in the art that they may equally well be made to rotate in opposite directions. The recorder also includes a top deck plate 20 through which the shafts 16 and 18 protrude and upon which there is mounted a recording head 22, of a type which is well-known to those skilled in the art. The recording head 22 may have a base plate 24 extending outwardly therefrom and may be secured to the top deck plate 20 by suitable fastening means, such as bolts **26*a* and 26*b*** passing through said base plate.

The tape 28 from supply reel 14, which, in the present embodiment of the invention, rotates in a clockwise direction, passes around idler roller 30, around idler roller 32, past recorder head 22, between the drive capstan 34 and pinch roller 36, and then around idler roller 38 to the take-up reel 12.

As seen in FIG. 2, the capstan 34 is driven by a stepping motor 40 which is secured to the top deck plate 20 in a conventional manner. It is herein to be noted that the capstan driving mechanism has been omitted from FIG. 2 for the purpose of clarity. However, the driving mechanism is of well-known construction and may be of the same type as described in our previously referred to co-pending patent application entitled, "Incremental Magnetic Tape Recorder."

Referring now to FIGS. 2 and 3, there is shown in detail the single "NegAtor" spring drive of the present invention. As discussed previously the reels 12 and 14 are mounted for rotation upon the shafts 16 and 18, respectively, and pinned thereto by means of pins 42. The shafts 16 and 18 are mounted for rotational movement in bearing cartridges 44 having upper ball bearing assemblies 46 and lower ball bearing assemblies 48. The bearing cartridges 44 are secured to the top deck plate 20 by means of screws 50 which secure the flanges 52 of the cartridges to the top deck. It is herein to be noted that the top deck plate 20 is detachably secured to the end plate 54 by means of screws 56 passing through said end plate and the skirt portion of the top deck plate 20.

Support legs 58 have one of the ends thereof connected to the top deck plate 20 and the other end thereof connected to the triangular support plate 60. Another triangular support plate 62 is also connected to the support legs 58 intermediate the ends thereof, whereby the plates 60 and 62 are disposed between the reel shafts 16 and 18. A shaft or rod 64 having a reduced end portion 66 is fixedly secured against rotation to the triangular plate 62 by means of a nut 68 and lock washer 69. A sun gear 70 is mounted for rotational movement about reduced end portion 66 by means of upper and lower ball bearing assemblies 72 and 74, respectively, as viewed in FIG. 2. A split ring 76 secured to the bottom of end portion 66 positionally secures sun gear 70 thereon.

A drum housing 78 includes an upper assembly plate 80 and a lower assembly plate 82. The housing is adapted to rotate about the shaft 64 and the hub 83 of the sun gear 70 by means of a first ball bearing assembly 84 disposed in the upper assembly plate 80 and surrounding said shaft and a ball bearing assembly 86 disposed in the lower assembly plate 82 and surrounding the hub 83 of the sun gear. It is herein to be noted that the hub 83 of the sun gear is rotatable within the bearing assembly 86.

As best seen in FIG. 2, a gear 88 is secured to the bottom portion of the sun gear hub 83 and meshes with a gear 90 which is securely fastened to the bottom end of shaft 16 by means of a pin 92. Similarly, a gear 94 is securely fastened to the bottom end of shaft 18 by means of a pin 96. Gear 94 meshes with a gear 98 which is secured to the lower assembly plate 82 in a suitable manner, such as by means of rivets 100. Disposed within the upper and lower assembly plates 80 and 82 are ball bearing assemblies 102 and 104, respectively, and a shaft 106 is rotatably positioned within said ball bearing assemblies. Similarly, disposed within upper and lower assembly plates 80 and 82 are ball bearing assemblies 108, and 110, respectively, having a shaft 112 rotatably positioned therein.

A planetary gear 114, having a drum 116 secured to the upper end thereof, is mounted on shaft 112 in meshing engagement with sun gear 70. Another drum 118 is mounted on the shaft 106. One end of a flat coil or flat spiral spring 120 is connected to the drum 116. This spring, which is a "NegAtor" spring, is forced to wind up around the drum 116 in the opposite direction to its normal (preformed) coil direction. The other end of the spring is coiled about drum 118 in its natural manner. The end of the spring connected to drum 118 does not need to be secured to said drum, since its bias is such that it tends to rotate about the drum in the desired direction so as to remain positioned thereabout. If desired, however, the end may be secured to the drum in a suitable manner. The other end of the spring, which is coiled around the drum 116, is secured thereto in some suitable manner, such as by being placed in slot 122 and held in place therein by means of a set screw 124.

Since the spring 120 is forced to coil around drum 116 in a direction which is against its coiling bias, it constantly exerts a force which tends to rotate drum 116 clockwise, as viewed in FIG. 3. This tendency to rotate drum 116 clockwise also tends to rotate gear 114, to which drum 116 is secured, thus tending to rotate sun gear 70 counter-clockwise, or tending to rotate gear 114 about sun gear 70 clockwise in a planetary fashion, and tends to cause assembly plates 80 and 82 to move in a clockwise direction. Since the gear 98 is secured to assembly plate 82, it also tends to rotate clockwise and thus cause the gear 94, which is in meshing engagement therewith, to tend to move counter-clockwise. Since the supply reel shaft 18 is secured to gear 94, it also tends to move counter-clockwise. Simultaneously, the tendency of the sun gear to rotate counter-clockwise also causes the gear 88, secured to said sun gear, to tend to rotate counter-clockwise, thus causing gear 90, which is in meshing engagement with gear 88, to tend to rotate clockwise. The tendency of gear 90 to rotate clockwise, in turn, causes take-up reel shaft 16 to tend to rotate clockwise.

It will be apparent that, since the supply and take-up reel shafts tend to rotate in opposite directions, the portion of recording tape disposed therebetween has a tension produced therein and is in a state of dynamic equilibrium. Thus, when the tape is metered past the recording head 22 by means of capstan 34, both the supply and take-up reels 14 and 12, respectively, are turned by the torque provided by the single "NegAtor" spring drive. It is to be noted that the difference between the number of turns an empty take-up reel makes, to take up the tape fed out by one complete turn of the full supply reel, is absorbed by the differential action of the planetary gear system hereinabove described.

In this connection, it is to be noted that the energy supplied by the spring to aid the advancement of the tape from the supply reel to the take-up reel when the "NegAtor" spring is winding itself upon the drum 118, in its normally closed direction, must be repaid when the spring is again rewound upon the drum 116 in a direction which is opposite to its normal direction. This occurs when the amount of tape on the supply and take-up reels is equal. At this time, the spring is almost entirely wound on the drum 118 in its normally coiled direction. It will be apparent that, when the amount of tape on the take-up reel is greater than that on the supply reel, the take-up reel will rotate less than the supply reel when the tape is advanced. Here again, this difference is absorbed by the differential action of the planetary gear system hereinbefore described. When the amount of tape remaining on the supply reel is less than that on the take-up reel and the "NegAtor" spring is again being wound on the drum 116, the energy to feed the recording tape past the recording head and the energy to wind the spring on the drum is supplied by the capstan drive. It is thus seen that the energy added to the system by the spring when the full supply reel was feeding the empty take-up reel is now returned to the system by means of the capstan drive. It is to be noted, however, that the torque produced by the spring and fed to the take-up reel shaft 16 earlier is still present, whereby at this time, the tape is advanced mainly by the power supplied by the single spring "NegAtor" system.

It is thus seen that the power required for the operation of the tape recorder in accordance with the present invention is supplied mainly by the spring drive, with the capstan drive supplying only a minor portion of the required power. Thus, the capstan drive acts largely as a tape metering device, which reduces the size of the motor required and correspondingly increases the battery life and on-station operating life.

It will be appreciated that the tape recorder is normally in stand-by condition, i.e., not running, and awaiting a signal to be recorded. Thus, it does not present any power drain upon the batteries. When a signal to be recorded is presented, it is fed to the recording head and recorded on the stationary tape. After recording has been completed, the tape is stepped forward a suitable distance, for example 0.005 inch, by the motor cooperating with the spring drive as explained hereinabove, and stopped to await the next signal to be recorded. After the next signal has been recorded, the tape is again stepped 0.005 inch and the process repeated.

The impulses for operating the stepping motor 40 are derived from the same, or associated, apparatus that supplies the signals to be recorded, such as described in the application of Charles A. Miville, Ser. No. 360,259, to which reference has been made hereinabove.

It will be apparent to those skilled in the art that the single "NegAtor" spring drive system herein described may also be used in tape recorders for intermittent sound and video recording, by substituting a continuously rotating motor for the stepping motor described herein.

It is again to be noted that the advantages of the present invention over our previously described copending patent application entitled "Incremental Magnetic Tape Recorder" are threefold: first, the use of a single spring drive mechanism results in a substantial reduction in the inertia of the reel system, thereby producing a faster reel response; second, the faster reel response results in a smaller power drain on the batteries, thus resulting in a recorder which has even longer on-station life between battery replacements; third, the tape recorder of the present invention is less expensive, by virture of the fact that it has fewer components.

We claim:

1. In a tape recorder having a pair of reel shafts for receiving coplanar tape reels adapted to have tape wound thereon, a recording head, and a capstan drive for said tape, the combination with said reel shafts of a single flat constant torque coil spring tending to rotate said reel shafts in a direction to cause substantially uniform tension in that portion of said tape disposed between said reel shafts, and means for interconnecting said reel shafts, wherein said interconnecting means includes pairs of meshing gears, one gear of each of said pairs being connected to one of said reel shafts respectively, the second gear of each of said pairs meshing with its corresponding shaft-connected gear, said flat coil spring exerting a driving torque on said second gear of each of said pairs respectively.

2. The combination defined in claim 1, wherein said capstan drive meters tape feed and includes a stepping motor, and wherein said reel shafts are driven by a combination of the torques exerted by said motor and by said spring.

3. The combination defined in claim 1, wherein said capstan drive includes a stepping motor, and a battery source for operating said motor, said reel shafts being driven by a combination of the torques exerted by said motor and by said spring, whereby tension on said tape is substantially constant regardless of which of said reels contains more tape.

4. In a tape recorder having a pair of reel shafts for receiving coplanar tape reels adapted to have a tape wound thereon, a recording head, and a capstan drive for said tape, in combination, a support member disposed between said reel shafts, a rod fixedly secured against rotational movement to said support member, a housing mounted on said rod, a drum rotationally mounted within said housing, a first gear mounted on said drum, a single flat constant torque coil spring disposed within said housing and having the outer end thereof secured to said drum, said coil spring being wound around said drum in a reverse fashion to its normal curvature, a second gear rotationally mounted on said rod in meshing engagement with said first gear, means for connecting said housing to one of said reel shafts, and means for connecting said second gear to the other of said reel shafts.

5. The combination defined in claim 4, wherein said housing is rotationally mounted on said rod.

6. The combination defined in claim 5, wherein said means for connecting said housing to one of said reel shafts includes a third gear secured to said housing and a fourth gear secured to said one of said reel shafts in meshing engagement with said third gear.

7. The combination defined in claim 6, wherein said means for connecting said second gear to the other of said reel shafts includes a fifth gear connected to said second gear and a sixth gear connected to said other of said reel shafts in meshing engagement with said fifth gear.

8. The combination defined in claim 6, including a second drum rotationally mounted within said housing and having the inner end of said flat coil spring positioned thereon.

9. The combination defined in claim 8, wherein said second gear is a sun gear and said first gear is a planet gear.

10. The combination defined in claim 9, wherein said motor is a stepping motor.

11. The combination defined in claim 10, wherein said capstan drive meters tape feed, and wherein said reel shafts are driven by a combination of the torques exerted by said motor and by said spring.

References Cited

UNITED STATES PATENTS

| | | | |
|---|---|---|---|
| 2,517,055 | 8/1950 | Thompson. | |
| 2,938,964 | 5/1960 | Collett et al. | 242—55.12 X |
| 2,996,264 | 8/1961 | Bygones | 242—55.14 |
| 3,252,669 | 5/1966 | Geri. | |
| 3,327,958 | 6/1967 | Tolnai | 242—55.14 |

GEORGE F. MAUTZ, *Primary Examiner.*